Dec. 8, 1964     W. B. BERNARD     3,160,885
HEIGHT FINDING RADAR

Filed Feb. 13, 1963     3 Sheets-Sheet 1

INVENTOR.
WILLIAM B. BERNARD
BY B. L. Zangwill
Vincent L. Carney
ATTORNEYS

Dec. 8, 1964     W. B. BERNARD     3,160,885
HEIGHT FINDING RADAR

Filed Feb. 13, 1963     3 Sheets-Sheet 2

INVENTOR.
WILLIAM B. BERNARD
BY
ATTORNEYS

Dec. 8, 1964  W. B. BERNARD  3,160,885
HEIGHT FINDING RADAR

Filed Feb. 13, 1963  3 Sheets-Sheet 3

INVENTOR.
WILLIAM B. BERNARD

BY
ATTORNEYS

United States Patent Office 3,160,885
Patented Dec. 8, 1964

3,160,885
HEIGHT FINDING RADAR
William B. Bernard, Longboat Key, Fla., assignor to the United States of America as represented by the Secretary of the Navy
Filed Feb. 13, 1963, Ser. No. 258,359
3 Claims. (Cl. 343—100)
(Granted under Title 35, U.S. Code (1952), sec. 266)

The invention described herein may be manufactured and used by or for the Government of the United States of America for governmental purposes without the payment of any royalties thereon or therefor.

This invention relates to a method and apparatus for scanning an antenna and more particularly relates to a method and apparatus for scanning with a radar antenna.

Present height finding radars have antennas which are mechanically rotated and which may be scanned in the vertical direction either mechanically or electronically. The mechanically rotated antennas have a great deal of inertia and are thus ordinarily rotated at a uniform speed. Since the targets of interest are not usually spaced uniformly in azimuth, the uniform rotation of the antenna results in the radar spending much time scanning space where there are no targets; thus the data rate on the targets of interest is much lower than would be the case where the radar did not waste so much of its time.

Electronic scanning in one direction is relatively easy. Systems for electronically scanning in two directions, however, are complicated and expensive so that it is desirable to use mechanical scanning in at least one plane. In height finding radar the angle that must be scanned in a vertical plane is much less than the angle that must be scanned in a horizontal plane. Consequently the time lost by using a mechanical scanning system instead of an electronic scanning system in the vertical plane is much less than that lost by the use of a mechanical scanning system in a horizontal plane. Accordingly it is an object of this invention to provide an improved method and apparatus for scanning radar.

It is a further object of this invention to provide an uncomplicated height finding radar scanning system which has a high data rate on the targets of interest.

It is a still further object of this invention to provide a height finding radar scanning system in which the antenna is mechanically scanned in a vertical direction and electronically scanned in a horizontal direction.

Other objects and many of the attendant advantages of this invention will be readily appreciated as the same becomes better understood by reference to the following detailed description when considered in connection with the accompanying drawings wherein.

Figure 1:
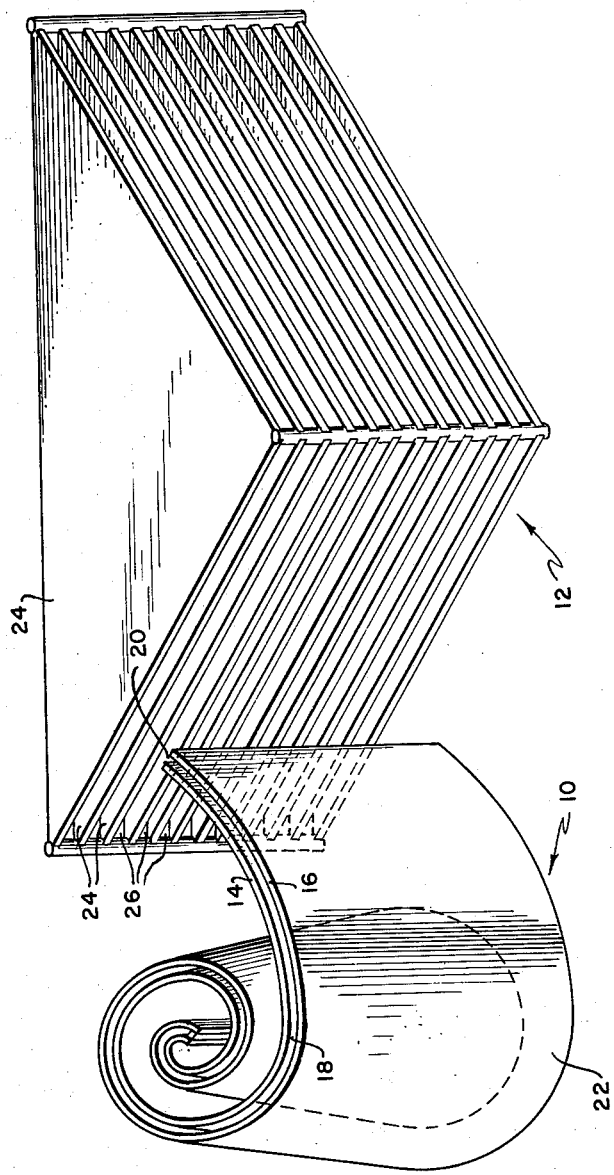
FIG. 1 is a perspective view of an antenna that is an illustrative embodiment of the invention.

Referring now in particular to FIG. 1, a perspective view of an antenna which is illustrative of the invention is shown, having two waveguides positioned so as to receive energy and to transmit energy from each other; one being a rotary waveguide feed cylinder 10 and the other being a prism 12. The rotary waveguide feed cylinder 10 includes two parallel sheet conductors 14 and 16 separated by an air space or suitable insulator 18 such as polystyrene which has low loss with respect to ultra high frequency waves. The two conductors 14 and 16 are spaced less than one half wavelength apart from each other. One end of the parallel-conductor waveguide forms a rectilinear aperture 20 which faces and is in proximity to the prism 12. The other end of the parallel-conductor waveguide is rolled into a hollow conical form which terminates in the annulus 22 at the end of the parallel-conductor waveguide opposite to the rectilinear aperture 20.

The prism 12 is a conventional metallic prism which includes a plurality of horizontally stacked sheets of conductors 24 separated by air gaps 26 or by sheets of suitable dielectric material such as polystyrene which has a low loss with respect to RF (radio frequency) waves. The stacks of conductors form a plurality of waveguides.

Figure 2:
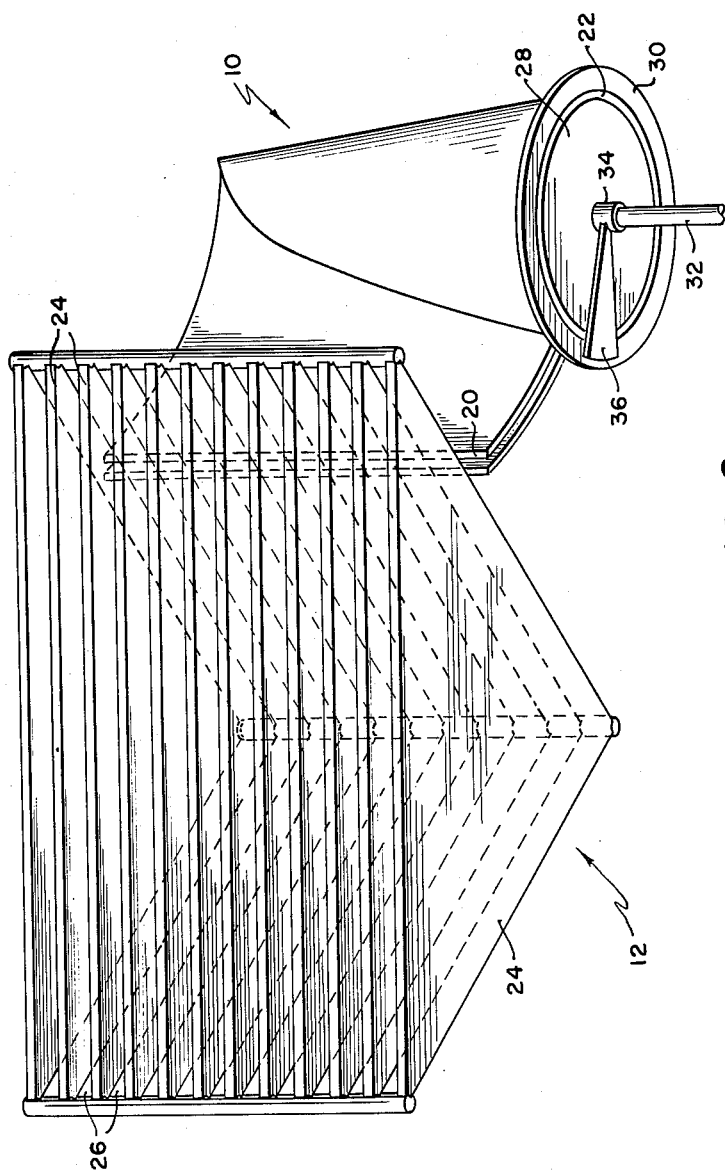
FIG. 2 is a perspective view of the same antenna from a different angle.

The same antenna is shown in a perspective view from a different angle in FIG. 2 in which the bottom of the rotary waveguide feed cylinder 10 and the prism 12 are shown. The base or bottom of the rotary waveguide feed cylinder 10 has a central disc 28 surrounded by the annular plate 30. The annular opening 22 is between the central disc 28 and the annular plate 30. A circular waveguide 32, perpendicular to the base of the rotary waveguide feed cylinder 10 and proximate to the center of the central disc 28, conducts the wave energy to the rotatable joint 34. A rotating waveguide 36 is coupled to the rotatable joint 34 and to the annular opening 22 so as to conduct the RF waves between the rotatable joint 34 and the waveguide 10.

Radio frequency waves transmitted through circular waveguide 32 into the rotary waveguide feed cylinder 10 are focused at a location on the rectilinear aperture 20 corresponding to one position on the annular opening 22 so that as the circular waveguide 32 rotates the RF waves scan the rectilinear aperture 20. Conversely, radio frequency waves transmitted through the rectilinear aperture 20 into the rotary waveguide feed cylinder 10 are focused at a location on the annular opening 22 corresponding to one position on the rectilinear aperture 20 so that as the radio frequency waves scan the rectilinear aperture 20 they are received by the rotating waveguide 36 at different successive points on the annular opening 22. An explanation of this operation and more detailed description of the rotary waveguide feed cylinder 10 may be found in U.S. Patent No. 2,504,333 issued to H. A. Iams and entitled "Radio Wave Device."

The rotation waveguide 36 is rotated uniformly so as to scan in a vertical direction in which the angle desired to be scanned is small. This causes the radio frequency waves to scan up and down the rectilinear aperture 20 which results in a vertical scanning from the face of the prism 12.

To obtain electron scanning in the horizontal direction in which the angle to be scanned is large, the frequency of the radio frequency waves is varied. The prism 12 deflects the radio frequency waves in a horizontal direction in much the same manner that a glass prism deflects light. The angle $\theta$ which the beam of radio frequency waves makes with the waveguide prism 12 depends upon the wave length of the radio frequency waves in free space, the angle A of the prism 12 and the index of refraction $\mu$ of the prism 12. The angular change in direction of the beam which corresponds to the change in the wave length of the radio frequency waves in free space is given by the formula:

$$\frac{d\theta}{d\lambda} = \frac{-2\frac{d\mu}{d\lambda}\sin\frac{A}{2}}{\left[1-\mu^2\sin^2\frac{A}{2}\right]^{1/2}}$$

Figure 3:
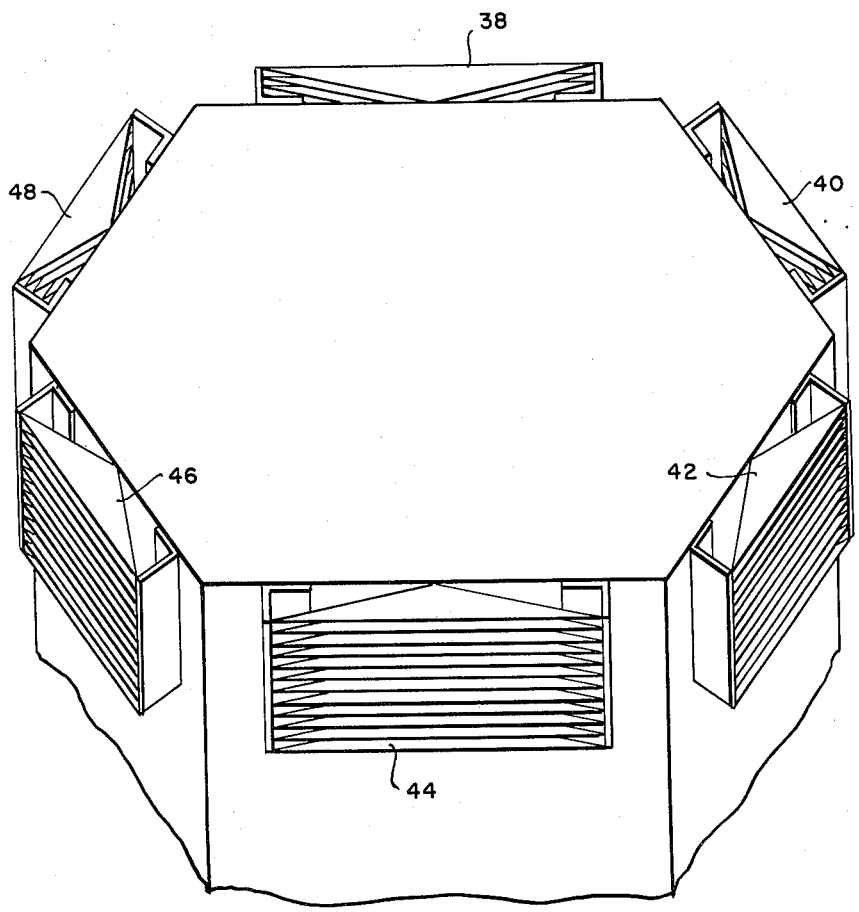
FIG. 3 is a perspective view of several of the antennas as they may be mounted for use.

In FIG. 3 six antenna systems 38, 40, 42, 44, 46 and 48 which are illustrative of the invention are shown fastened to the superstructure of a ship. The entire antennas are moved to compensate for the roll and pitch of the ship and to give gross changes in elevation angles. For fast vertical scan to locate the center of the target reflection and for minor changes of elevation angle, only the feed system is moved. Since in either case the change of angle is small and the inertia of the feed system is small the scan speed is very rapid. This system having mechanical scanning in the vertical direction and electronic scanning in the horizontal direction provides a data rate which is an appreciable fraction of that which can be achieved by a fully electronically scanned system with very little more complication than that of a mechanically rotated system.

Obviously many modifications and variations of the present invention are possible in the light of the above teachings. It is therefore to be understood that within the scope of the appended claims the invention may be practiced otherwise than as specifically described.

What is claimed is:

1. A scanning system for a height finding radar comprising:

generating means for generating radio frequency energy having a periodically varying frequency;

rotary feed cylinder means, coupled to said generating means, for receiving said radio frequency energy and causing it to scan in a vertical direction in synchronism with the rotation of the rotary waveguide of said rotary feed cylinder; and waveguide prism means, positioned so as to directly receive said radio frequency energy from said rotary feed cylinder means, for deflecting said radio frequency energy in a horizontal direction in a fixed relationship with the frequency of said radio frequency energy.

2. A scanning system for height finding radars as defined in claim 1, but further characterized by having a plurality of waveguide prism means, said plurality of waveguide prism means being mounted in the exterior surface of a single housing.

3. A scanning system for height finding radars as defined in claim 2, but further characterized by having said plurality of waveguide prism means comprising six waveguide prism means.

References Cited by the Examiner
UNITED STATES PATENTS

| | | | |
|---|---|---|---|
| 2,504,333 | 4/50 | Iams | 343—780 |
| 2,554,936 | 5/51 | Burtner | 343—780 X |
| 2,599,896 | 6/52 | Clark et al. | 343—773 X |

CHESTER L. JUSTUS, *Primary Examiner.*